Aug. 27, 1929.    F. MERTZ    1,725,815
MACHINE FOR DECORTICATING FIBROUS PARTS OF AGAVES AND OTHER PLANTS
Filed Aug. 3, 1927    2 Sheets-Sheet 2

Patented Aug. 27, 1929.

1,725,815

UNITED STATES PATENT OFFICE.

FRITZ MERTZ, OF MAGDEBURG, GERMANY, ASSIGNOR TO FRIED. KRUPP GRUSON-WERK AKTIENGESELLSCHAFT, OF MAGDEBURG-BUCKAU, GERMANY.

MACHINE FOR DECORTICATING FIBROUS PARTS OF AGAVES AND OTHER PLANTS.

Application filed August 3, 1927, Serial No. 210,391, and in Germany August 3, 1926.

This invention relates to machines for decorticating fibrous parts of agaves and other plants, in which the leaves or other parts of the plants (hereinafter briefly termed leaves) are conveyed past decorticating drums. The invention relates especially to such machines in which the leaves are held by the conveying means at their butt ends (that is, the ends nearer the stem or root of the plant in growth), practically the whole of the leaf with the exception of the short butt end thus held being decorticated in the first operation, and this butt end being decorticated in a second operation. In known machines of this kind the leaves are gripped between conveying means such as ropes, chains or the like which convey them past a conveyor disc at the points of decortication. If the leaf possesses a pronounced thickness at its butt end this grip will be sufficient to secure them, but if that part of the leaf is only slightly tapered it is found advisable to provide auxiliary gripping means to reinforce the grip of the conveying means at the position of decortication. For this purpose according to the present invention a pressing device is provided to press or clamp the butts of the leaves against the opposing part of the conveyor disc without interfering with the usual gripping action of the ropes. The grooved or fluted edges of the conveyor disc are thereby pressed more deeply into the pulp of the butt end and thus in co-operation with the conveying means cause the leaf to be held securely at the first working position where the long pointed end of the leaf, that is to say almost the entire leaf, is decorticated. This pressing device may be constructed in different ways. For example it may consist of a pressure member preferably spring-loaded and mounted at a slight distance from the conveyor disc, the pressure member being provided in the direction of travel with grooves for the passage of the conveying means and between these grooves with projecting edges which in co-operation with the conveyor disc and its grooved edges exert a clamping action upon the end of the leaf so that the edges penetrate into the pulp of the end of the leaf. Instead of such a pressure member, however, one or more pressure rollers suitably provided with grooves can be used.

The accompanying drawings illustrate two constructional examples of the subject-matter of the invention applied to a decorticating machine, in which the leaves to be decorticated are gripped between two upper ropes and one lower rope, by means of which they are guided past the decorticating drums.

Figure 1:
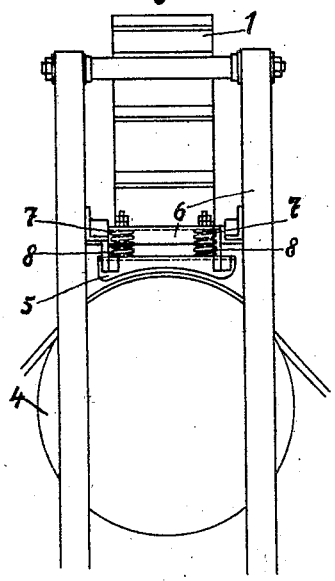
Figure 1 represents in side elevation a pressing device applied to a decorticating machine.
Figure 2:
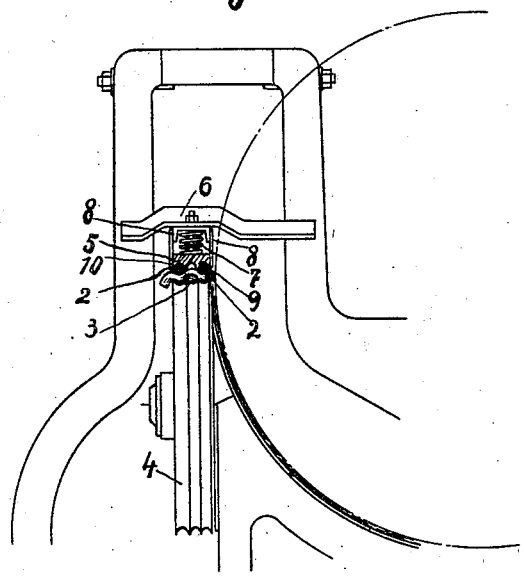
Figure 2 represents the same device in end elevation.

Figs. 2$^a$ and 3$^a$ are detail sectional views showing the manner in which two types of auxiliary grippers cooperate with the conveyor disc.

The leaves to be decorticated are, when passing by the decorticating drum 1, gripped at the stem or root end between the upper ropes 2 and the lower ropes 3 upon the conveyor disc 4. Above this disc 4 is arranged a pressing member 5, the distance of which from the transport disc 4 is smaller than the thickness of the stem or root end of the leaf it is desired to decorticate. The pressure member 5, which has the same width as the decorticating drum, is subject to the influence of the springs 7 mounted in the machine frame 6 and is arranged to slide in the guides 8. The working surface of the pressure member is provided with grooves or furrows 9, through which the upper ropes can run freely. Between these grooves are projections 10, which engage between the ropes, and independently of these, act directly upon the end of the leaf, by pressing it against the periphery of the conveyor disc 4. This can be seen more clearly from Fig. 2$^a$, which shows the parts on a larger scale. Not only the projections 10 but also the edges of the grooves of the conveyor disc at the same time penetrate into the pulp of the end of the leaf. The pressure exerted by the pressure member upon the material to be treated is so calculated that the leaves are not hampered in their movement in the direction of transport.

Figure 3:
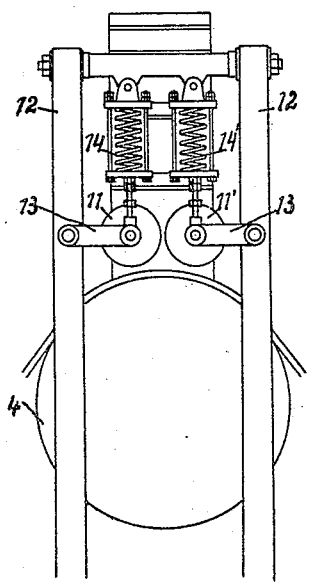
Figure 3 is a side elevation and Figure 4 an end elevation illustrating a modified device comprising pressing rollers.
Figure 4:
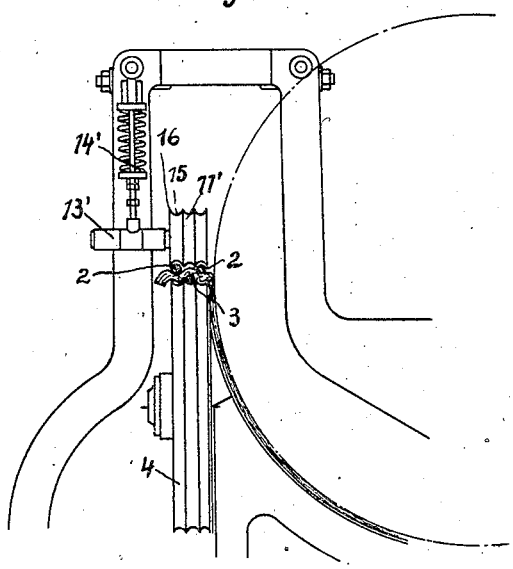
Figure 2A:
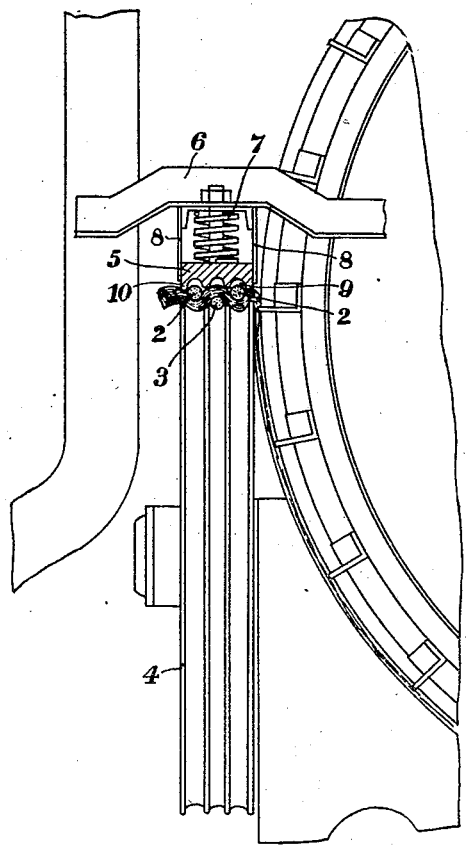
Figure 4A:
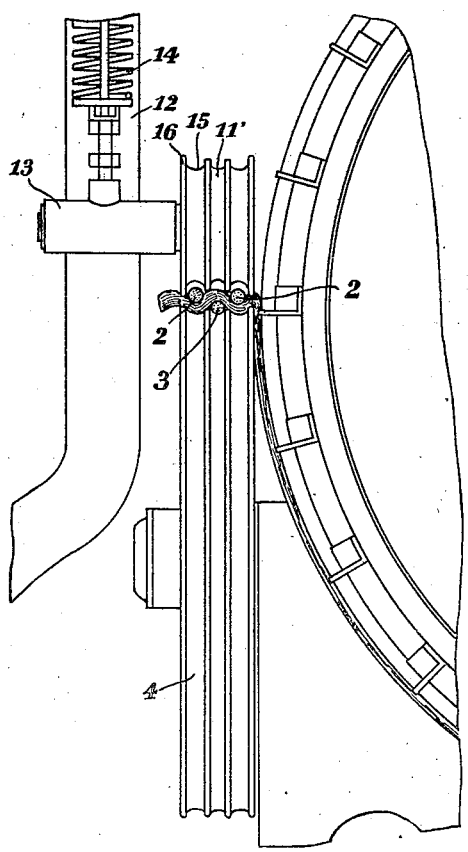

Instead of the pressure member described, a pressure roller or several such rollers in series can be employed. Referring to Figure 3 two grooved rollers 11 and 11′ are provided, each of these two rollers being mounted at the free end of a lever 13 or 13′ pivoted to the machine frame 12. The free end of each lever is subject to the influence of a pressure spring 14, 14'. The rollers operate with their grooves 15 and projecting edges 16 in the same way as the grooves 9 and projections 10 of the aforesaid pressure member 5 and co-operate with the conveying disc 4 independently of the rope clamping, in effect directly, whilst the conveying ropes themselves are not touched by the pressure rollers and run freely through the grooves 15. This is clearly shown in Fig. 4ª, where the parts appear on a larger scale. If only one pressure roller be provided it is then preferably arranged at that point where the pull exerted upon the leaves by the scraping knives is found by experience to be the greatest.

What I claim is:—

1. In an apparatus of the kind described, a decorticating drum, a conveyor disc located at the point of decortication, means for gripping leaves and conveying them over said conveyor disc, and an auxiliary gripping device adapted to clamp the leaves to said conveyor disc independently of said first mentioned gripping and conveying means.

2. In an apparatus of the kind described, a decorticating drum, a conveyor disc at said drum, means for conveying leaves over said conveyor disc and gripping means straddling said conveying means and pressing parts of the leaves directly against said conveyor disc.

3. In an apparatus of the kind described, a decorticating drum, a conveyor disc at said drum, a plurality of parallel endless conveying members running over said conveyor disc, and a pressure member provided on its working surface with grooves for the passage of the conveying members and projecting edges adapted to act between said conveying members and press parts of the leaves directly against said conveyor disc during the decortication.

4. In an apparatus of the kind described, a decorticating drum, a conveyor disc at said drum, a plurality of parallel endless conveying members running over said conveyor disc, and a pressure member having a roller provided with grooves for the passage of the conveying members and projecting edges adapted to act between said conveying members and press parts of the leaves directly against said conveyor disc during the decortication.

The foregoing specification signed at Berlin, Germany, this 7th day of July, 1927.

FRITZ MERTZ.